(12) United States Patent
Nicholson et al.

(10) Patent No.: US 9,512,931 B2
(45) Date of Patent: Dec. 6, 2016

(54) LOW EMISSION VALVE ASSEMBLY

(71) Applicant: PARKER HANNIFIN MANUFACTURING LIMITED, Devon (GB)

(72) Inventors: Spencer Andrew Nicholson, Devon (GB); Justin Charles Tomlinson, Devon (GB); Jacek Sroka, Devon (GB); Matthew Weinle, Norfolk (GB)

(73) Assignee: PARKER HANNIFIN MANUFACTURING LIMITED, Devon (GB)

( * ) Notice: Subject to any disclaimer, the term of this patent is extended or adjusted under 35 U.S.C. 154(b) by 0 days.

(21) Appl. No.: 14/629,790

(22) Filed: Feb. 24, 2015

(65) Prior Publication Data
US 2015/0167862 A1  Jun. 18, 2015

Related U.S. Application Data

(63) Continuation of application No. 14/343,714, filed as application No. PCT/GB2012/052129 on Aug. 31, 2012, now abandoned.

(30) Foreign Application Priority Data

Sep. 6, 2011  (GB) .................................. 1115376.4

(51) Int. Cl.
| F16K 41/04 | (2006.01) |
| F16K 27/02 | (2006.01) |
| F16K 41/02 | (2006.01) |
| F16K 1/00  | (2006.01) |

(52) U.S. Cl.
CPC .............. *F16K 27/0254* (2013.01); *F16K 1/00* (2013.01); *F16K 27/02* (2013.01); *F16K 41/02* (2013.01); *F16K 41/04* (2013.01)

(58) Field of Classification Search
CPC ...... F16K 27/0254; F16K 27/02; F16K 1/00; F16K 41/02; F16K 41/04
USPC .................. 251/214, 318, 368; 277/520–526
See application file for complete search history.

(56) References Cited

U.S. PATENT DOCUMENTS

| 1,683,293 | A | * | 9/1928 | Lindbloom | ............. F16K 41/02 |
| | | | | | 251/318 |
| 2,169,410 | A | | 8/1939 | Drane | |
| 2,569,023 | A | * | 9/1951 | Sanford | ................ F16K 41/023 |
| | | | | | 251/214 |
| 2,912,266 | A | | 11/1959 | Nordell | |

(Continued)

OTHER PUBLICATIONS

International Search Report for corresponding Application No. PCT/GB2012/052129 dated Nov. 2, 2012.

*Primary Examiner* — John Bastianelli
(74) *Attorney, Agent, or Firm* — Renner, Otto, Boisselle & Sklar, LLP

(57) ABSTRACT

A valve assembly (1) controls the flow through a fluid pathway. The valve assembly (1) comprises a valve body (2) having a bore, and a spindle (20) received within the bore which is actuatable to open and close the valve. The spindle (20) has an axially upstream end arranged towards the fluid pathway and an opposing downstream end. A first seal (50) is provided about the spindle between the spindle and the bore and a biasing element (64) is arranged to impart an axial compressive force to the sealing element (50). The biasing element (64) is located within the valve body (2) between the spindle (20) and the bore on the downstream side of the seal to enables a more direct compressive force to be applied to the seal to improve sealing efficiency.

13 Claims, 2 Drawing Sheets

(56) References Cited

U.S. PATENT DOCUMENTS

Figure 1:
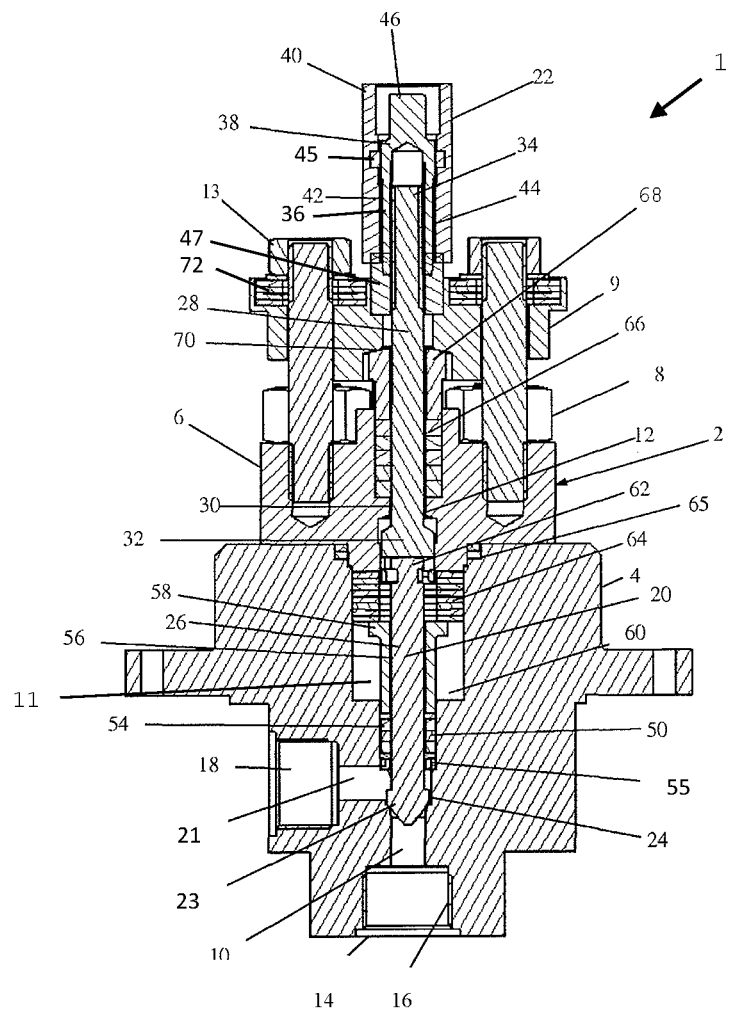

| | | | | |
|---|---|---|---|---|
| 4,082,105 A | * | 4/1978 | Allen | F16J 15/164 |
| | | | | 251/214 |
| 4,576,385 A | | 3/1986 | Ungchusri et al. | |
| 5,131,666 A | * | 7/1992 | Hutchens | F16K 41/02 |
| | | | | 251/214 |
| 5,190,264 A | * | 3/1993 | Boger | F16K 41/04 |
| | | | | 251/214 |
| 5,263,682 A | * | 11/1993 | Covert | F16K 41/046 |
| | | | | 251/214 |
| 5,593,166 A | | 1/1997 | Lovell et al. | |
| 5,791,629 A | * | 8/1998 | Wears | F16K 41/02 |
| | | | | 251/214 |
| 5,927,685 A | * | 7/1999 | Gosling | F16K 5/0694 |
| | | | | 277/522 |
| 2004/0155217 A1 | | 8/2004 | Wears | |

* cited by examiner

LOW EMISSION VALVE ASSEMBLY

This application is a continuation of U.S. patent application Ser. No. 14/343,714 filed Mar. 7, 2014 which is a U.S. National Phase of International Application No. PCT/GB2012/052129 filed Aug. 31, 2012 which claims priority to United Kingdom Application No. 1115376.4 filed Sep. 6, 2011, which are hereby incorporated herein by reference in their entirety.

The present invention relates to a valve assembly. In particular, the invention relates to a valve assembly including a bore and a valve spindle which is suitable for connecting to a process line or pressure vessel and which is arranged to limit fugitive emissions from the valve bore.

Within the instrumentation industry, it is necessary to take fluid from a fluid container such as a process pipeline or pressure vessel, so as to take measurements of quantities such as pressure, temperature, flow and fluid level measurements.

The instruments which are used to take such measurements are typically connected to a fluid container by a system of pipes, manifolds and valves. The connection system can include one or more tapping connections for tapping the fluid container.

The instruments which are used to take such measurements require maintenance, such as calibration. In order to carry this out it is necessary to modify or close the flow of the fluid between the fluid container and the instrument. Such flow modification is currently carried out by a number of methods all of which in some way require systems which are attached to the main process apparatus by means of a valve. A shutoff or metering valve designed to prevent the fluid it controls from escaping to the atmosphere is commonly referred to as a packing valve. The escape of gas is typically prevented by means of a stem that rotates or moves within its seal material during actuation. The dynamic seal interface separates the medium from the atmosphere.

There is a trend to legislate to regulate emissions of potentially harmful substances to the environment, for example the EU's IPPC directive 96/61/EC aimed at minimising pollution from various industrial sources throughout the European Union. An important part of this legislation is reducing fugitive emissions, which will have significant consequences for all processes. According to the IPPS all plants and factories which fail to comply with the standards set by the directive may be closed from this point.

A typical European refinery loses between 600 and 10,000 tonnes of emissions per annum. Around 70% of these losses are estimated to be caused by plant equipment such as pipe flanges, pumps, valves and vessels. Leakage from valves is often the biggest source, reportedly accounting for around 50% of the fugitive emissions within the chemical and petrochemical industries.

Irrespective of the environmental impact, there is a tremendous financial burden on industry because fugitive emissions represent a huge loss of product, and cause of plant inefficiency. However, the true costs to industry are not always appreciated, as many of the costs associated with fugitive emissions are hidden, such as labour and materials to repair leaks, wasted energy, environmental fines and clean up costs, lost sales due to a poor green image, claims for personal injury and more. In this way, reducing fugitive emissions not only protects the environment, but can save companies time and money.

UK patent application number 0714225.0 describes a valve configured to reduce fugitive emissions in which a pair of o-ring seals is provided on system end of a valve spindle between the spindle and the bore of the valve body. Expansion of the dual o-ring arrangement provides effective fugitive emissions sealing, while a further fire safe back up gland seal is provided in that temperature and/or pressure exceeds the operational range of the o-rings.

For certain high temperature and high pressure applications, it not desirable or not legally permitted to provide o-ring seals formed from an elastomeric material, as the o-ring material is not capable of withstanding the operational conditions. In other application, environmental conditions may be such that o-ring seals are not suitable due to degradation or wear.

It is therefore desirable to provide an alternative valve arrangement which addresses the above described problems and/or which offers improvements generally.

According to the present invention there is provided a valve assembly as described in the accompanying claims.

In an embodiment of the invention there is provided a valve assembly for controlling flow through a fluid pathway comprising a valve body having a bore; a spindle received within the bore which is actuatable to open and close the valve, the spindle having an axially upstream end arranged towards the fluid pathway and an opposing downstream end; a first seal provided about the spindle between the spindle and the bore; and a biasing element arranged to impart an axial compressive force to the sealing element. The biasing member is located within the valve body between the spindle and the bore on the downstream side of the seal. Conventionally any seal biasing means is provided externally to the valve body on the dry side of the valve. However, it has been found that by providing the seal biasing means within the valve boy enables a more direct compressive force to be applied to the seal which significantly improves the sealing efficiency. The provision of a live loaded flow-side seal which is internal to the valve is therefore highly advantageous but has not previously been considered.

The first seal preferably comprises a first section formed of a first material and a second section formed of a second material which is softer than the first material, the first and second sections being arranged such that when the first seal is axially compressed the second material is caused to cold flow between the first section and the bore to increase the efficiency of the first seal. The first section acts as a supporting and/or reinforcing section to prevent excessive deformation of the softer second section. As the second section compresses the softer material cold flows and wicks between the first section and the bore which acts to fill any remaining gap between the second section and the bore thereby increasing the sealing efficiency. As such, the valve may be assembled with the first seal closely toleranced with the spindle and the bore but no so close as to inhibit assembly, with the tolerance then being greatly increased on loading of the first seal. This type of compression sealing therefore enables highly efficient sealing without the requirement for elastomeric seals such as o-rings which are not able to be used in high temperature high pressure applications.

The first seal may comprise support rings located at axially opposing ends of the seal which are formed from the first material and define the first section and a plurality of sealing rings formed from the second material axially located between the end rings and defining the second section. The end rings support and reinforce the second section at the axially opposed contact points. In addition, by providing end rings at both ends provides increased sealing at both end of the seal due to the clod flow of the softer second seal section.

The first material is preferably polyether ether ketone (PEEK) and the second material is preferably Polytetrafluoroethylene (PTFE), with the PTFE material being softer than the PEEK while both materials include the required high melting points.

The valve assembly preferably further comprises a collar axially located about the spindle on the downstream side of the first seal between the first seal and the biasing element which is arranged to compress the seal under the action of the biasing element.

The valve assembly preferably further comprises a second seal provided about the spindle between the spindle and the bore which is axially spaced along the spindle at a position downstream from both the first sealing element and the biasing element. A valve assembly according to claim 2 further comprising secondary biasing means for imparting a compressive force to the second seal. The second seal provides a back up sealing means for sealing against any emissions which have passed the first seal thereby further reducing fugitive emissions.

The valve assembly may further comprise a guide member axially fixed relative to the valve body and an axially movable clamping member slidingly supported on the guide member and about the spindle at a downstream axial position from the second seal. The secondary biasing means urges the clamping member towards the second seal to impart said compressive force thereto. This means of biasing the second seal is provided externally to the valve body and is therefore accessible and adjustable by the operator.

The valve assembly may further comprise a slidable collar provided about the spindle between the second seal and the clamping member such that the collar is urged into engagement with the second seal by the clamping member to impart said compressive force thereto.

The second seal is preferably a back up fire-safe seal formed from a material having a melting point greater than the material of the first seal. This enables the valve to utilise thermoplastic flowable materials for the first seal to increase sealing efficiency while also providing a fail safe seal in the event of temperatures approaching or exceeding the melting point of PEEK or PTFE thereby enabling the valve to meet both the relevant emissions and temperature safety standards.

The body section preferably comprises a lower section axially located at the flow wise upstream end of the valve assembly and an upper section axially located at the flow wise downstream end and the collar and biasing element are located within the lower body section and the biasing element is axially compressed against the collar by the a portion of the upper body section.

A third seal is provided between the upper and lower body sections on the downstream side of the first seal.

The third seal is formed from a material having a higher melting point than the material of the first seal. The second and/or third seals are preferably formed from a graphite material.

The valve body includes an inlet and an outlet and the spindle is actuatable to open and close the bore to selectively permit fluid flow between the inlet and the outlet.

The valve assembly may further include a chamber section located downstream of the first seal between the first seal and the biasing element which includes an expanded diameter defining an inner wall which is spaced from the spindle and the collar. The chamber is arranged to collect solid material present in any sour gas which may pass then first seal to prevent spoiling of the biasing element.

The biasing element is preferably a spring and more preferably comprises series of coned disc springs such as Bellville springs.

Figure 2:
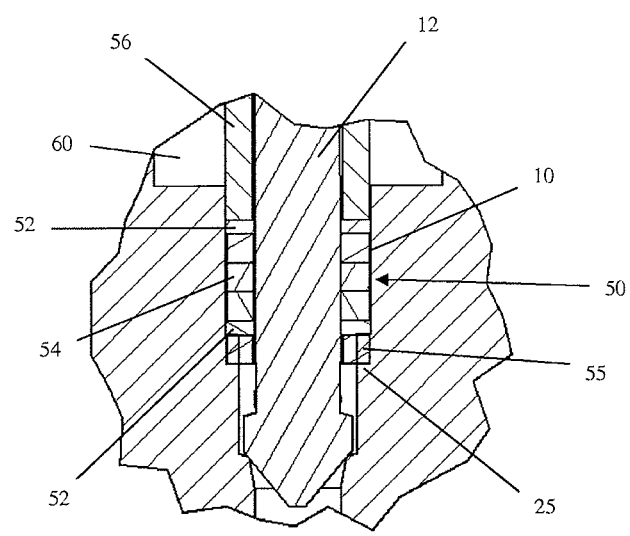

The present invention will now be described by way of example only with reference to the following illustrative figures in which:

FIG. 1 is a cross sectional view of a valve assembly according to an embodiment of the invention; and FIG. 2 is a detailed view of the first seal assembly of the valve of FIG. 1.

Referring to FIG. 1, there is provided a needle valve 1. Reference to a needle valve should be construed broadly to cover any valve arrangement including a spindle including a valve element which moves translationally within a bore in order to open and close the valve. The valve 1 includes a substantially cylindrical valve body 2, which comprises a lower valve body section 4 which defines the system side of the valve body 2 and connects to a pressure line or vessel. The valve body 2 further includes an upper valve body section 6 which is secured to the lower valve body section 4 by bolts 8. The valve body section 2 includes an inner bore 10 comprising a lower bore 11 extending through the lower body section 6 and an upper bore 12 extending through the upper body section 6. The lower bore 11 and upper bore 12 are contiguous and aligned such that they share a common longitudinal axis. An upper gland adjuster body 9 (also herein referred to as a clamp member) is connected to the upper section 6 of the valve body 2 by bolts 13. The longitudinal axial position of the gland adjuster body 4 with respect to the valve body 2 is adjustable via the bolts 13.

The terms 'upper' and 'lower' are used relatively with regard to the pressurised system side of the valve, with the pressurised proximal end of the valve being referred to as the lower end, and the distal end which is accessible by the operator in use being referred to as the upper end. Similarly, the terms 'upstream' and 'downstream' refer to the end of the valve associated with the pressurised system to be closed by the valve and the opposing end respectively.

A valve inlet 14 is defined at the distal end of the lower valve body section 4 which is in fluid connection with the distal end of the bore 10. The inner wall of the inlet 14 includes a threaded portion 16 for connecting the valve to the process line or pressure vessel. The inlet 14 comprises an expanded diameter bore which is wider than the bore 10 at the point the bore 10 adjoins the inlet 14. An outlet 18 is longitudinally spaced from the inlet 14 along the bore 10 away from the distal end. The outlet 18 is arranged perpendicular to the inlet 14, and is connected to the bore 10 by an interconnecting radial bore section 21 which extends transversely to the longitudinal axis of the bore 10.

A non-rotating valve spindle 20 is positioned within the axial bore 10 of the valve body 2, and also passes through an axial bore in an upper gland adjuster body 26 towards its distal end. The spindle is connected at its distal end with a manually (or machine) operable actuator 22 (such as a handle or T bar). At its proximal end the spindle 20 comprises a tapered valve tip 24 which seals against a corresponding tapered seat 23 formed by the wall of lower bore 11 between the outlet 18 and the inlet 16 to seal tight the flowpath between the inlet 16 and outlet 18 when the valve is in the closed position. The spindle 20 includes a lower stem portion 26 and an upper stem portion 28, the lower stem portion having the valve tip 24 at its free lower end and being connected to the upper stem portion 28 at its upper end. The lower stem portion 26 is connected to the upper stem portion 28 in such a way that it is freely rotatable relative thereto, and such that upper portion 28 is able to actuate the lower portion in an axial direction only.

An annular projection 30 extends inwardly within the lower part of the upper bore 12 defining a section of the bore of reduced diameter which is approximately equal to the diameter of the upper stem section 28 such that the upper stem section slidingly fits within the projection 30 in a closely toleranced manner. The upper stem portion 28 includes a diametrically expanded lower end 32 which is located on the lower side of the projection 30. The projection 30 acts as a stop to limit axial movement of the spindle 20 in the upwards direction through engagement between the expanded end 32 of the upper stem portion 28.

The upper stem portion 28 is provided with a threaded portion 34 on the outer surface of it's upper end, which is engaged with a corresponding threaded portion 36 on the inner surface of an intermediate sleeve 38 of the actuator 22. The outer thread 34 of the upper stem portion 28 and the inner thread 36 of the intermediate sleeve is preferably an M6 left hand thread. The actuator 22 further includes an outer sleeve section 40 having a thread on its inner surface which engages with a corresponding thread 44 on the outer surface of the intermediate sleeve 38. The inner thread 42 of the outer sleeve 40 and the outer thread 36 of the intermediate sleeve is preferably an M10 right hand thread. The outer sleeve 40 is fixed relative to the upper gland adjuster 9, which is fixed relative to the valve body.

The upper of the intermediate sleeve 38 is provided with a square section male projection 46 which is configured to be received by a corresponding female recess in a turn handle or similar tool to provide a rotational fixing for effecting rotation of the intermediate sleeve 38 by the turn handle. As the direction of the corresponding threads between the cap 40 and the intermediate sleeve 38 is formed in a different direction to corresponding threads between the intermediate sleeve 38 and the upper stem portion 28, rotation of the intermediate sleeve 38 causes it to move axially relative to the fixed outer sleeve 40 and the valve body 2 which causes corresponding axial translation of the valve spindle 20. The expanded head 32 of the upper stem portion 28 is formed having diametrically opposed flat sections on the side wall thereof, which engage with corresponding flat portions formed on the inner surface of the bore 10 which interact to prevent rotation of the upper stem portion 28. As such, the spindle 20 is only moved by the actuator 22 in an axial direction.

The valve 1 is moved to the open position when actuator 22 is rotated to move the valve spindle 20 axially upwards such that the valve tip 24 lifts away from the valve seat 23 to open the fluid pathway between the inlet 16 and the outlet 18. To prevent pressurised fluid from escaping the valve 1 between the valve spindle 20 and the bore 10 a first seal assembly 50 is provided between the bore valve spindle 20 and the bore 10 towards the lower proximal end of the valve spindle 20 at an axial location above the seat 23 and above the intersection of the outlet radial bore section 20 and the bore 10. A step section 25 in the bore axially locates the seal assembly 50. The location of the seal assembly 50 is such that when the valve spindle 20 is in the open position the first seal assembly 50 is directly subjected to the system pressure from the flow channel to which the valve 1 is connected.

To protect the thread between the intermediate sleeve 38 and the outer sleeve section 40 and prevent the ingress of dirt, oil and other contaminants which may foul the thread, a wiper 45 is provided. The wiper 45 is provided about the intermediate sleeve section 38 between the intermediate sleeve 38 and the outer sleeve 40 and is received in a groove in the outer sleeve section 40 and seals the thread from the atmosphere. As the intermediate sleeve moves axially relative to the outer sleeve 40, the wiper 45 remains stationary relative to the outer sleeve 40 and wipes and material which has accumulated on the intermediate sleeve 38 on its external outer surface.

The portion of the spindle 20 between the second locking collar 68 and the actuator 22 is exposed as it extends out of the bore 10. To protect this portion of the spindle 20 and to prevent the ingress of material into the more 10, a gator 47 is provided about the spindle. The gator 47 is configured to compress and expand as the intermediate sleeve moves axially.

The wiper 45 and/or the gator 47 are formed from a natural material such as wool. Preferably they are formed from compressed woollen fibres in the form of felt. Typically such components are formed of rubber or similar elastomeric material. However, such material is known to degrade and perish over time. It has been surprisingly found that the felt wiper 45 and gator 47 not only have a longer life span but actually improve during use as they saturate. In addition, the felt material provides significantly improved fire retardant properties.

As shown in FIG. 2, the first seal assembly 50 comprises outer reinforcement rings 52 located at the upper and lower ends of the seal assembly 50. Sandwiched between the upper and lower reinforcing rings 52 is a plurality of sealing rings 54 formed from a softer material than the reinforcement rings 52. The lower reinforcement rings 52 seats against a stop ring 55 which is seated on the step 25, and which axially fixes the first seal assembly 50 in the downward axial direction. A locking collar 56 is provided about the valve spindle 20 at a position axially above the first seal assembly 50 between the valve spindle 20 and the bore 10. The lower end of the collar 56 abuts the axially upper surface of the upper reinforcing ring 52. At its upper end the collar includes a flared flanged section 58. The locking collar 56 and the stop ring 55 are preferably both formed from the same material and preferably both formed from stainless steel.

The upper end of the collar 56 is located within a chamber 60 defined by a diametrically expanded section of the bore 10 with the outer wall of the upper part of the collar 56 being spaced from the bore 10. At its upper end, the chamber 60 is closed by a cylindrical projection 62 extending from the lower surface of the upper body section 6 which extends into the chamber 60. The chamber 60 houses a plurality of coned disc springs such as Bellville springs 64 in an axially stacked formation. The springs 64 are compressed between the projection 62 at their upper end and the flange of the collar 58 at their lower end. The projection 62 is axially fixed and the collar 58 is free to slide about the valve spindle 20. The springs 64 therefore bias the collar 58 downwardly and urge it against the first spring arrangement 50 clamping and compressing it between the lower edge of the collar 56 and the step 25 in the bore 10.

The reinforcing rings 52 are formed from a first thermoplastic polymer material, which is preferably polyether ether ketone (PEEK), which is selected for its mechanical and chemical resistance properties that are retained to high temperatures. The sealing rings 54 are formed from a second thermoplastic polymer material, which is preferably Polytetrafluoroethylene (PTFE). PTFE also provides a high temperature resistance, but mechanically is softer than the PEEK material of the reinforcement rings 52. During assembly the seal assembly 50 is provided about the valve spindle 20 followed by the collar 56 and then the Bellville springs 64. As the upper body section 6 is bolted to the lower body section the projection 62 compresses the springs 64, with the axial length of the projection 62 to determining in the magnitude of compression. Once in compression the springs 64 urge the collar 56 against the seal assembly 50. The outer reinforcing rings 52 provide mechanical resistance during compression to prevent deformation at the contact points with the collar 56 and the stop ring 55. The reinforcement rings 52 are also tolerance to provide a seal between the valve spindle and the bore 10. The inner sealing rings 54 are clamped and compressed between the reinforcing rings 52 under the live loading action of the springs 64. The PTFE material of the sealing rings 54 is softer than the PEEK material of the reinforcement rings, and is selected such that during loading between the reinforcement rings 52, the PTFE material of the sealing rings begins to cold flow and wick between the outer surfaces of the reinforcement rings 52 and the inner surface of the bore 10. This cold flow wicking action of the sealing rings 54 enhances the sealing efficiency of the seal assembly 50 by closing any gap between the already tightly tolerance fitting between the reinforcement rings 52 and the bore 10. This high sealing efficiency is maintained by keeping the seal assembly 50 under live loading using the springs 64. This is made possible by providing the springs 64 within the valve body on the sealed system wet side of the valve, and by clamping them between the upper 6 and lower 4 body sections.

As the springs 64 are provided on the system wet side of the valve within the bore 10 of the valve body 2 they may potentially be exposed to sour gas emissions escaping past the seal assembly 50 and containing solid material. This is most likely to occur along the outer surface of the valve spindle 20 through pathway defined between the inner surface of the collar 56 and the outer surface of the spindle 20. To mitigate the risk of fouling of the springs 54 by deposition of solid material from any emission gases a plurality of channels are formed in the upper surface of the flange section 58 which extend radially outwards and define a plurality of fluid channels between the spindle 20 and the chamber 60. The chamber 60 is extended axially downwards from the springs and positioned proximate the base of the collar 56. The flange section 58 is spaced radially inwards of the inner wall of the chamber 60. As such, the chamber 60 defines a collection chamber in which any solid material within fugitive emission gases passing between the collar 56 and the spindle 20 may gravitationally settle and collect rather than causing fouling of the springs 64.

In addition to the first seal assembly 50, additional back up seals are provided in the form of second back up seal 66 and third back up seal 65. The third back up seal 65 is provided between the upper body section 6 and the lower body section 4 at the point of intersection between the lower surface of the upper body section 6 and the outer surface of the projection 62 extending downwardly therefrom. As such, the third back up seal 65 prevents the escape of any gases from the chamber 60 between the upper 6 and lower 4 body sections. The second seals 65 are ring seals and are preferably formed from a graphite material and are clamped between the upper 6 and lower 4 body sections during bolting these two components together.

The second back up seal 66 is provided about the upper stem section 28 of the spindle 20 between the upper stem section 28 and the upper bore 12 of the upper body section 6. The second seal 66 comprises a series of graphite ring seals which are axially located at their lower end against the annular projection 30. A second locking collar 68 engages and clamps the upper end of the second seal 66. The clamping pressure on the locking collar 68 is applied by the clamp member 9 which is bolted to the upper body member 6 by bolts 13. The clamp member 9 includes an engagement surface 70 which is arranged to bear down on the upper end of the locking collar 68 when the clamp member 9 is bolted to the upper body sections 6. To ensure constant compression on the locking collar 68 the bolts 13 are live loaded by providing coned disc springs such as Bellville springs beneath the head of each bolt 13 between the bolt 13 and the gland adjuster body 9. As the stem of each bolt 13 is rigid and axially fixed to the upper body section 6 the springs 72 urge the gland adjuster body 9 downwardly forcing and biasing the engagement surface 70 against the locking collar 68. The valve 1 therefore includes a first seal assembly 50 which is live loaded by series of springs provided on the system wetted side of the valve 1 within the bore 10 of the valve body 2 and a further second seal arrangement 66 which is live loaded by externally located springs 72 on the process dry side of the valve.

The second seals 66 are preferably formed from a graphite material and act as a fire safe back up with the graphite having a significantly higher melting point than the thermoplastic elements of the first seal assembly 50 but with the first seal assembly 50 providing significantly improved sealing efficiency under normal operating conditions.

Utilising the internally live loaded first seal assembly 50 with the fire safe back up seal 66, the valve 1 has been shown to operate across a pressure range of zero to a maximum rated pressure of up to Class 2,500 i.e. approximately 6,200 PSIG, and it is anticipated that a higher pressure range of 7,000 PSIG would also be achievable. The lack of elastomeric materials such as those commonly used in O ring seals for example, with the seal assembly instead comprising PTFE and PEEK materials, and the back up seals being formed of a graphite material, enable the valve to operate within an agreed range of −20° C. whilst still maintaining its Class A(HS) fugitive omissions rating. The valve has been shown to maintain Class A(HS) fugitive omissions requirement down to −50° C. under non actuated conditions.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

It will be appreciated that in further embodiments various modifications to the specific arrangements described above and shown in the drawings may be made. For example, while the valve assembly is described as a needle valve, it will be appreciated that the present invention may be applicable to other valves comprising a valve spindle, such as a ball valve.

The invention claimed is:

1. A valve assembly for controlling flow through a fluid pathway comprising:
   a valve body having a bore;
   a spindle received within the bore which is actuatable to open and close the valve assembly, the spindle having an axially upstream end arranged towards the fluid pathway and an opposing downstream end;
   a first seal provided about the spindle between the spindle and the bore;
   a first resilient biasing element arranged to impart an axial compressive force to the first seal, wherein the first resilient biasing element is located within the valve body between the spindle and the bore on the downstream side of the first seal;

a second seal provided about the spindle between the spindle and the bore which is axially spaced along the spindle at a position downstream from both the first seal and the biasing element; and a second resilient biasing element for imparting a compressive force to the second seal, wherein the compressive force imparted by the second resilient biasing element to the second seal is adjustable independently of the axial compressive force imparted by the first resilient biasing element to the first seal.

2. The valve assembly according to claim 1, wherein the first seal comprises a first section formed of a first material and a second section formed of a second material which is softer than the first material, the first and second sections being arranged such that when the first seal is compressed the second material is caused to cold flow between the first section and the bore to increase the efficiency of the first seal.

3. The valve assembly according to claim 2, wherein the first seal comprises support rings located at axially opposing ends which are formed from the first material and define the first section and a plurality of sealing rings formed from the second material axially located between the end rings and defining the second section.

4. The valve assembly according to claim 1, wherein the valve assembly further comprises a collar axially located about the spindle on the downstream side of the first seal between the first seal and the biasing element axially biases the collar toward the first seal to compress the first seal under the action of the biasing element.

5. The valve assembly according to claim 1, wherein the valve body includes an inlet and an outlet and the spindle is actuatable to open and close the bore to selectively permit fluid flow between the inlet and the outlet.

6. A valve assembly for controlling flow through a fluid pathway comprising:

a valve body having a bore;

a spindle received within the bore which is actuatable to open and close the valve assembly, the spindle having an axially upstream end arranged towards the fluid pathway and an opposing downstream end;

a first seal provided about the spindle between the spindle and the bore;

a biasing element arranged to impart an axial compressive force to the first seal;

wherein the biasing element is located within the valve body between the spindle and the bore on the downstream side of the first seal; and wherein the first seal comprises a first section formed of a first material and a second section formed of a second material which is contiguous with the first section and softer than the first material, the first and second sections being arranged such that when the first seal is compressed the second material is caused to cold flow between the first section and the bore to increase the efficiency of the first seal; and wherein the first material is polyether ether ketone (PEEK) and the second material is polytetrafluoroethylene (PTFE).

7. A valve assembly for controlling flow through a fluid pathway comprising:

a valve body having a bore;

a spindle received within the bore which is actuatable to open and close the valve assembly, the spindle having an axially upstream end arranged towards the fluid pathway and an opposing downstream end;

a first seal provided about the spindle between the spindle and the bore;

a biasing element arranged to impart an axial compressive force to the first seal;

wherein the biasing element is located within the valve body between the spindle and the bore on the downstream side of the first seal;

a second seal provided about the spindle between the spindle and the bore which is axially spaced along the spindle at a position downstream from both the first sealing element and the biasing element;

a secondary biasing means for imparting a compressive force to the second seal; and guide member axially fixed relative to the valve body and an axially movable clamping member slidingly supported on the guide member and about the spindle at a downstream axial position from the second seal, wherein the secondary biasing means urges the clamping member towards the second seal to impart said compressive force thereto.

8. The valve assembly according to claim 7 further comprising a slidable collar provided about the spindle between the second seal and the clamping member such that the collar is urged into engagement with the second seal by the clamping member to impart said compressive force thereto.

9. The valve assembly according to claim 7, wherein the second seal is a back up fire-safe seal formed from a material having a melting point greater than the material of the first seal.

10. The valve assembly according to claim 9 further comprising a collar axially located about the spindle on the downstream side of the first seal between the first seal and the biasing element which is arranged to compress the first seal under the action of the biasing element, and wherein the valve body comprises a lower section axially located at the flow wise upstream end of the valve assembly and an upper section axially located at the flow wise downstream end and the collar and biasing element are located within the lower body section and the biasing element is axially compressed against the collar by a portion of the upper body section.

11. The valve assembly according to claim 10, wherein a third seal is provided between the upper and lower body sections on the downstream side of the first seal.

12. The valve assembly according to claim 11, wherein one or both of the second and third seals are formed from a graphite material.

13. The valve assembly according to claim 12, wherein the third seal is formed from a material having a higher melting point than the material of the first seal.

* * * * *